United States Patent
Loch

(10) Patent No.: US 9,813,387 B2
(45) Date of Patent: Nov. 7, 2017

(54) VEHICLE COMMUNICATION NETWORK SECURITY SYSTEM AND METHOD

(71) Applicant: General Electric Company, Schenectady, NY (US)

(72) Inventor: Mark Elliott Loch, Erie, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 14/974,160

(22) Filed: Dec. 18, 2015

(65) Prior Publication Data

US 2017/0180328 A1    Jun. 22, 2017

(51) Int. Cl.
| | |
|---|---|
| G06F 11/00 | (2006.01) |
| H04L 29/06 | (2006.01) |
| H04W 4/04 | (2009.01) |
| B60T 8/17 | (2006.01) |

(52) U.S. Cl.
CPC ........ *H04L 63/0428* (2013.01); *B60T 8/1705* (2013.01); *H04W 4/046* (2013.01)

(58) Field of Classification Search
CPC ............ H04L 63/0428; H04W 4/046
USPC .................................................. 726/22–25
See application file for complete search history.

(56) References Cited

U.S. PATENT DOCUMENTS

| | | | |
|---|---|---|---|
| 8,331,926 B2 | 12/2012 | Mitchell et al. | |
| 8,943,594 B1* | 1/2015 | Arrowood | G06F 21/53 726/23 |
| 2004/0098616 A1 | 5/2004 | Jenner | |
| 2013/0086635 A1 | 4/2013 | Hershey et al. | |
| 2013/0298184 A1* | 11/2013 | Ermagan | G06F 21/54 726/1 |
| 2014/0137254 A1* | 5/2014 | Ou | H04L 63/145 726/24 |
| 2014/0181977 A1* | 6/2014 | Hammond | H04L 63/14 726/23 |
| 2014/0259143 A1 | 9/2014 | Kuhnl | |

(Continued)

OTHER PUBLICATIONS

Zhao et al., "Combination of PANA and Diameter in Trusted Vehicle Network," 2009 Second International Conference on Future Information Technology and Management Engineering Year: 2009 pp. 3-7.*

(Continued)

*Primary Examiner* — Roderick Tolentino
(74) *Attorney, Agent, or Firm* — Global Patent Operation; John A. Kramer

(57) ABSTRACT

A vehicle communication network security system) includes one or more processors configured to be disposed onboard a vehicle system traveling together along a route. The processors examine one or more characteristics of an incoming data signal received by the processors from a communication device disposed onboard the vehicle system. The processors determine whether the incoming data signal is a secure data signal or an insecure data signal based on the one or more characteristics, communicate the incoming data signal to one or more onboard systems of the vehicle system for use by the one or more onboard systems in controlling operation of the vehicle system responsive to determining that the incoming data signal is the secure data signal, and prevent the incoming data from being communicated to the one or more onboard systems responsive to determining that the incoming data signal is the insecure data signal.

23 Claims, 5 Drawing Sheets

(56) References Cited

U.S. PATENT DOCUMENTS

| | | | |
|---|---|---|---|
| 2015/0106937 A1* | 4/2015 | Jung | H04L 63/145 726/24 |
| 2015/0172300 A1* | 6/2015 | Cochenour | H04L 63/145 726/23 |
| 2015/0215325 A1* | 7/2015 | Ogawa | G06F 17/30091 726/23 |
| 2016/0021127 A1* | 1/2016 | Yan | G06F 21/554 726/23 |
| 2016/0092700 A1* | 3/2016 | Smith | G06F 21/566 726/1 |
| 2016/0205123 A1* | 7/2016 | Almurayh | H04L 63/1425 726/23 |

OTHER PUBLICATIONS

Chen et al. "Classified security protection evaluation for vehicle information system," 2015 International Conference on Cyber Security of Smart Cities, Industrial Control System and Communications (SSIC) Year: 2015 pp. 1-6.*

* cited by examiner

VEHICLE COMMUNICATION NETWORK SECURITY SYSTEM AND METHOD

BACKGROUND

Modern vehicles can include several devices that communicate data signals with each other to control operations of the vehicles. For example, onboard devices of the vehicles can communicate to determine speeds, accelerations, braking actions, or the like, of the vehicles. Some of these vehicles, such a rail vehicles, can have systems that communicate with off-board devices. These off-board devices can provide data that is used to determine the location of the vehicle, the speed of the vehicle, speed limits of the route being traveled upon, locations where braking is required, or other information.

The varied communication used by vehicles can pose a significant security threat to operation of the vehicles. Malicious signals sent from devices to the vehicles could alter operation of the vehicles. For example, rail vehicles may receive signals that cause the rail vehicles to ignore speed limits, braking instructions, or the like. These signals can result in the vehicles operating in unsafe manners, which could result in significant injury and damage.

BRIEF DESCRIPTION

In one embodiment, a system (e.g., a vehicle communication network security system) includes one or more processors configured to be disposal onboard a vehicle system formed from one or more vehicles traveling together along a route. The one or more processors are configured to examine one or more characteristics of an incoming data signal received by the one or more processors from a communication device disposed onboard the vehicle. The one or more processors can be configured to determine whether the incoming data signal is a secure data signal or an insecure data signal based on the one or more characteristics, to communicate the incoming data signal to one or more onboard systems of the vehicle system for use by the one or more onboard systems in controlling operation of the vehicle system responsive to determining that the incoming data signal is the secure data signal and to prevent the incoming data from being communicated to the one or more onboard systems responsive to determining that the incoming data signal is the insecure data signal.

In one embodiment, a method (e.g., for securing a vehicle communication system) includes examining one or more characteristics of an incoming data signal received by a communication network security device disposed onboard a vehicle system formed from one or more vehicles traveling together along a route, determining whether the incoming data signal is a secure data signal or an insecure data signal based on the one or more characteristics, communicating the incoming data signal to one or more onboard systems of the vehicle system for use by the one or more onboard systems in controlling operation of the vehicle system responsive to determining that the incoming data signal is the secure data signal and preventing communication of the incoming data to the one or more onboard systems responsive to determining that the incoming data signal is the insecure data signal.

In one embodiment, a system (e.g., a communication network security system) includes one or more processors configured to be disposed onboard a vehicle system formed from one or more vehicles traveling together along a route. The one or more processors are configured to examine one or more characteristics of an incoming data signal received by the one or more processors from a communication device disposed onboard the vehicle, and to determine whether the incoming data signal is a secure data signal or an insecure data signal based on the one or more characteristics. The one or more processors can communicate the incoming data signal to one or more onboard systems of the vehicle system for use by the one or more onboard systems in controlling operation of the vehicle system responsive to determining that the incoming data signal is the secure data signal, and can communicate the incoming data signal to a controller of the vehicle system that is configured to control one or more of tractive effort or braking effort generated by the vehicle system responsive to the incoming data signal being the secure data signal. The controller may be in addition to the one or more onboard systems of the vehicle system.

BRIEF OF THE DRAWINGS

DETAILED DESCRIPTION

One or more embodiments of the inventive subject matter described herein relate to systems and methods that provide for secure communication within a vehicle communication system that is onboard a vehicle system. The vehicle system may include a single vehicle, or may include two or more vehicles traveling together along a route. The vehicles may or may not be mechanically coupled with each other. The systems and methods provide for secure communications by examining data (e.g., data signals) received at the vehicle communication system. The data signals may be received from sources onboard the vehicle system and/or sources that are off-board the vehicle system. The systems and methods described herein can protect vehicle communication networks from cyber security threats originating from onboard and/or off-board the vehicle system. The systems and methods can use a combination of designated security threats to analyze data traffic in the vehicle communication system to prevent against a wide variety of security threats on the vehicle system. The designated security threats can be remotely upgraded to counter new threats as the communication threats continue to evolve.

Some vehicle systems, such as rail vehicles (e.g., locomotives) are exposed to a large number of communication threats. These threats can be malicious and work to take over the vehicle systems to cause damage to the vehicle systems or surrounding areas, to gain access to proprietary control system software and hardware, and the like. The systems and methods described herein can provide advanced firewall protection along with deep packet inspection in order to identify and prevent varied cyber-attacks on a vehicle communication system.

Figure 1:
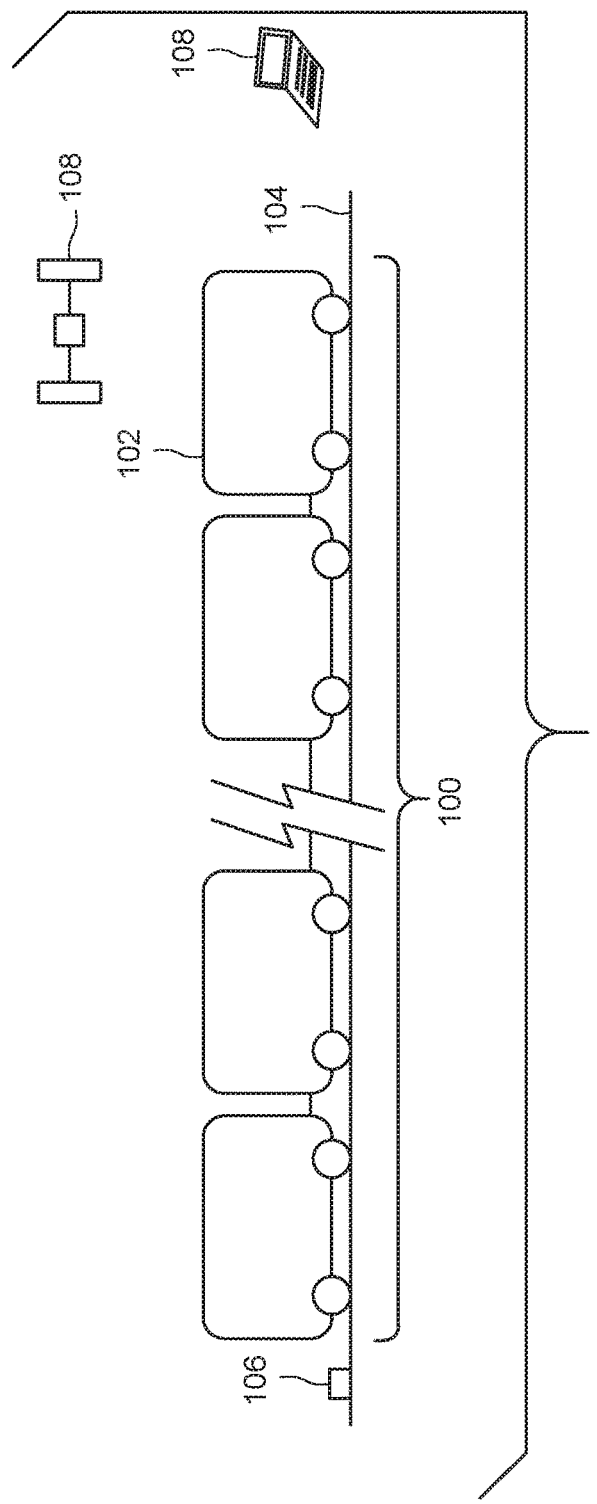
FIG. 1 illustrates one example of a vehicle system having a communication system shown in FIG. 2 disposed onboard.

FIG. 1 illustrates one example of a vehicle system 100 having a communication system (shown in FIG. 2) disposed onboard. The vehicle system 100 can be formed from plural vehicles 102, which may include propulsion-generating vehicles (e.g., locomotives, automobiles, marine vessels, mining vehicles, etc.), non-propulsion-generating vehicles (e.g., rail cars, trailers, barges, mining baskets, etc.), or a combination thereof. Alternatively, the vehicle system 100 may be formed from a single vehicle. The vehicle system 100 travels along a route 104, which can represent a track, road, waterway, or the like.

Figure 2:
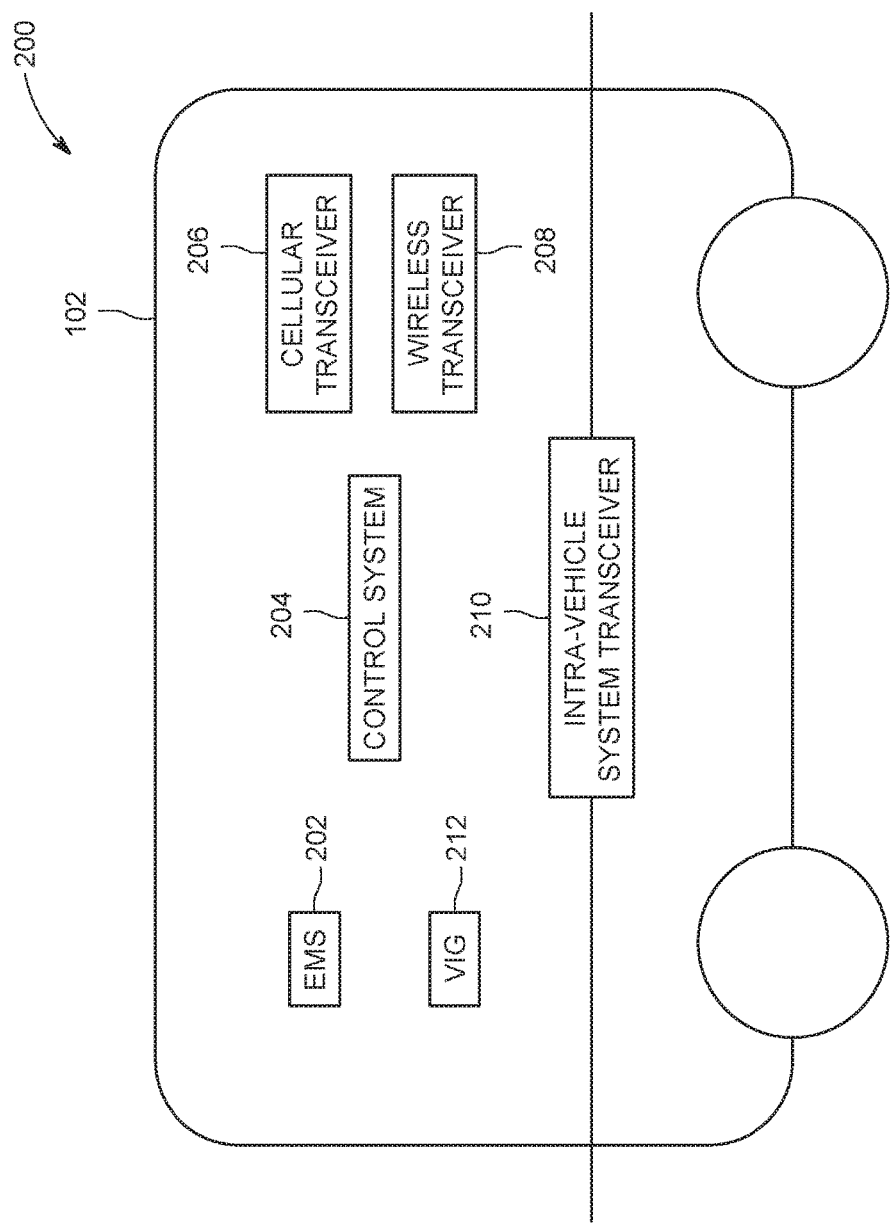
FIG. 2 illustrates the communication system of the vehicle system shown in FIG. 1.

With continued reference to the vehicle system 100 shown in FIG. 1, FIG. 2 illustrates the communication system 200 of the vehicle system 100 and several devices disposed onboard at least one of the vehicles 102 in the vehicle system 100 that may communicate with each and/or among each other via the communication system 200 according to one embodiment. The devices (also referred to as components) shown onboard the vehicle 102 may be disposed onboard a single vehicle 102 of the vehicle system 100 or optionally may be distributed among two or more vehicles 102 of the vehicle system 100.

The communication system 200 communicates data between various devices that may be onboard and/or off-board the vehicle system 100. The communication system can receive data signals (e.g., wireless data signals) from off-board wayside devices 106, such as roadside transponders, signals, sensor systems (e.g., hotbox detectors), positive train control transponders, etc. The communication system may receive data signals from other off-board devices 108, such as satellites, wireless devices (e.g., cellular phones, computers, remote controls, etc.), a dispatch tower, or other locations. Different components onboard the vehicle system 100 may communicate with and/or among each other to control operations of the vehicle system 100. For example, devices onboard the same and/or different vehicles 102 may communicate with each other via the communication system 200 to control tractive efforts produced by the vehicle system 100, to control braking efforts produced by the vehicle system 100, to coordinate tractive efforts and/or braking efforts between the vehicles 102 in the vehicle system 100, to coordinate operations performed by the same type and/or different types of components onboard the same and/or different vehicles 102 in the vehicle system 100, to display information from one or more components onboard one vehicle 102 on a display device on the same or different vehicle 102, etc.

For example, an energy management system 202 ("EMS" in FIG. 2) may determine operational settings to be used in controlling movement of the vehicle 102 or vehicle system 100. The energy management system 202 can receive data from databases, off-board dispatch centers, or other locations, and use this data to determine throttle settings, brake settings, or the like, of the vehicle 102 or vehicle system 100 as a function of time and/or distance along the route 104 in order to cause the vehicle system 100 to arrive at a designated location along the route 104 within a designated time period and/or at a designated time, to reduce fuel consumption of the vehicle system 100, to reduce emission generation by the vehicle system 100, to improve handling of the vehicle system 100, etc., relative to the same vehicle system 100 traveling along the same route 104 for the same trip according to other operational settings (e.g., those settings that cause the vehicle system 100 to travel at a speed limit of the route 104).

A control system 204 (also referred to herein as a controller) represents hardware circuitry that includes and/or is connected with one or more processors (e.g., microprocessors, controllers, field programmable gate arrays, integrated circuits, etc.) that controls operations of the vehicle 102 and/or vehicle system 100. The control system 204 can generate signals that are communicated to propulsion systems of the vehicle system 100 (e.g., motors, alternators, generators, etc.), braking systems of the vehicle system 100 (e.g., air brakes, electrically controlled brakes, etc.), or other systems to control operations (e.g., movement) of the vehicle system 102. The control system 204 can include one or more input and/or output devices, such as keyboard, an electronic mouse, stylus, microphone, touchscreen, other display screen, or the like, for communicating with an operator of the vehicle 102 or vehicle system 100. The control system 204 is operably connected with components of the communication system 200 that are disposed onboard the vehicle 102, onboard other vehicles 102 in the vehicle system 100, and/or off-board the vehicle system 100 to communicate with these components for controlling operations of the vehicle system 102. For example, the control system 204 may receive instructions from the EMS 202 that dictate bow the vehicle system 100 is to move at different locations during a trip.

A cellular transceiver 206 of the communication system 200 represents hardware transceiving circuitry that wirelessly communicates with one or more components onboard and/or off-board the vehicle 102 and/or vehicle system 100 using cellular technology. For example, off-board devices 106, 108 can communicate signals to cellular towers, which then relay these signals to the cellular transceiver 206. A wireless transceiver 208 of the communication system 200 represents hardware transceiving circuitry that wirelessly communicates with one or more components onboard and/or off-board the vehicle 102 and/or vehicle system 100 using other wireless technology. For example, off-board devices 106, 108 can communicate signals with the wireless transceiver 208 using WiFi, satellite signals, or other communication techniques.

An intra-vehicle system transceiver 210 of the communication system 200 represents hardware transceiving circuitry that communicates with one or more components onboard other vehicles 102 in the same vehicle system 100 via one or more conductive pathways 212. In one embodiment, the system transceiver 216 can represent a distributed power (DP) wireless communication device that wirelessly communicates data signals between two or more vehicles in the vehicle system in order to coordinate tractive efforts and/or braking efforts generated by the two or more vehicles.

The conductive pathways 212 can represent wires, cables, buses, etc. Examples of conductive pathways 212 include multiple unit (MU) cables, train lines, or the like. Components of the vehicle system 100 onboard other vehicles 102 can communicate with each other via the conductive pathways 212. For example, the EMS 202, cellular transceiver 206, wireless transceiver 208, control system 204, or the like, onboard one vehicle 102 can communicate with another vehicle 102 via the intra-vehicle system transceiver 210.

A vehicle interface gateway 212 ("VIG" in FIG. 2) represents hardware circuitry that includes and/or is connected with one or mere processors (e.g., microprocessors, controllers, field programmable gate arrays, integrated circuits, etc.) that manages and controls communication of signals communicated to and/or from at least some (or all) of the components of the communication system 200 disposed on the same vehicle 102 as the VIG 212. For example, the VIG 212 may act as an information gateway between components disposed onboard and/or off-board the vehicle 102 shown in FIG. 1 and the control system 204. The VIG 212 may operate as a funnel, switch, router, or gateway through which communications with the control system 204 pass.

During normal, secure operation of the communication system, data signals may be communicated between known communication devices onboard and/or off-board the vehicle system 100. The known devices may be devices that are previously identified as being devices that are allowed to communicate with the vehicle system 100 in order to control operations of the vehicle system 100. The EMSs 202, VIGs 212, control systems 204, one or more devices 106, 108, etc., are some, but not all, of the devices that can securely communicate with the communication system of the vehicle system 100. Communications between these devices and the control system 204 of a vehicle 102 may or may not be secure in terms of data encryption or accessibility of the communications. For example, a wireless signal that is communicated from an off-board device to the communication system of the vehicle system 100 may be secure if the signal is sent from a secure device, such as a device that has been identified as being allowed to communicate with the vehicle system 100, even if the wireless signal is not encrypted and/or may be obtained and/or read by other systems or devices that are not identified as being allowed to communicate with the vehicle system 100. But, a wireless signal that is communicated from an off-board device to the communication system of the vehicle system 100 may not be secure (e.g., may be an insecure data signal) if the signal is sent from another device, such as a device that has not been identified as being allowed to communicate with the vehicle system 100, even if the wireless signal is encrypted. The systems and methods described herein can operate to allow secure data signals to be communicated to and used to control operations of the vehicle system 100, while preventing the insecure data signals from being used to control operations of the vehicle system 100.

The data included in the signals that are communicated to the communication system may be examined in order to determine whether one or more characteristics of the data signals indicate that the data signals are sent from a secure device or not. The data included in the secure data signals may be communicated to components of the vehicle system and optionally used to control operations of the vehicle, while the data included in insecure data signals may be prevented from being communicated to these components and/or prevented from being used to control operations of the vehicle. This can ensure that signals sent from malicious or unauthorized sources are blocked or prevented from reaching the components of the vehicle system, are prevented from causing harm to the vehicle system, and/or are prevented from obtaining proprietary information from the vehicle system.

Figure 3:
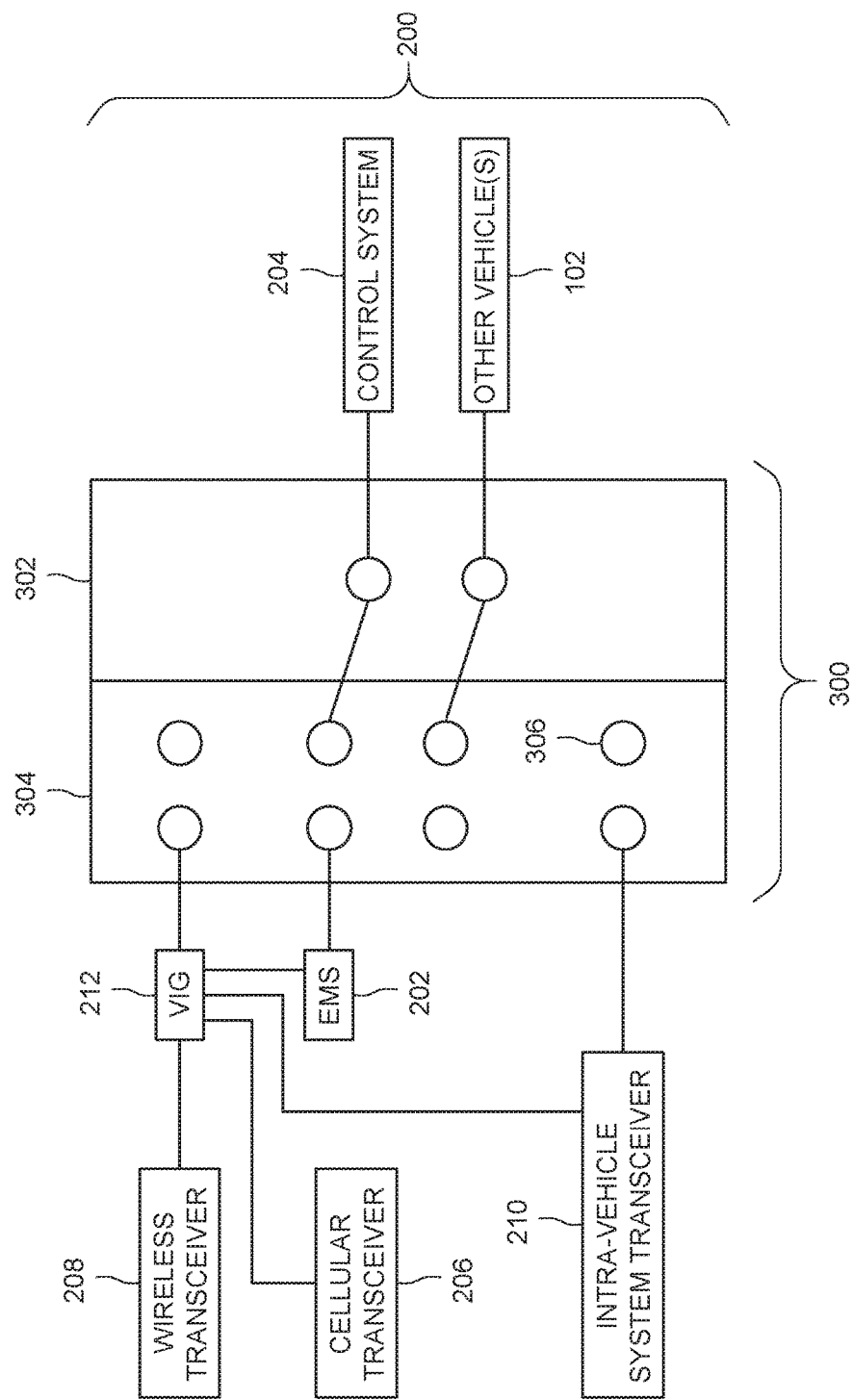
FIG. 3 illustrates one embodiment of a vehicle communication network security system.

FIG. 3 illustrates one embodiment of a vehicle communication network security system 300. The security system 300 may be disposed onboard the vehicle 102 shown in FIG. 1. The security system 300 may be included in and/or operably connected with the communication system 200 to provide for secure communication between onboard and/or off-board components described herein.

The security system 300 represents communication circuitry through which incoming data signals to a vehicle 102 are examined to determine whether the signals are secure or insecure signals. The security system 300 includes a barrier device 302 and optionally includes a network switch 304. The barrier device 302 represents hardware circuitry that includes and/or is connected with one or more processors (e.g., microprocessors, controllers, field programmable gate arrays, integrated circuits, etc.) that examines characteristics of the incoming data signals (e.g., data signals communicated to the control system 204 of the vehicle 102 and/or another vehicle 102) to determine whether the incoming data signals are insecure data signals. The barrier device 302 may include a memory and/or may access an external memory, such as a computer hard drive, a flash drive, etc.

The switch 304 represents hardware circuitry that directs where the data signals communicated to and/or from the components onboard a vehicle 102 are communicated. The switch 304 can optionally be referred to as an Ethernet switch and/or a router. The switch 304 can examine information about the data signals, such as addresses (e.g., Internet Protocol, or IP, addresses), to determine where to communicate each data signal. The incoming data signals sent to the control system 204 may be received into the switch 304. Prior to directing the signals to the control system 204, the switch 304 may convey the signals to the barrier device 302 for examination and determination of whether the signals are insecure signals. The signals that are identified as secure signals may then be communicated from the device 302 to the control system 204 (and/or another location). In one embodiment, the barrier device 302 represents one or more modular cards or card units that are inserted into the switch 304. The barrier device 302 can be a modular device to be used in a multiple applications on the vehicle system 100. The device 302 can be incorporated into already existing modular platforms onboard the vehicle 102. In the illustrated embodiment, the switch 304 may include additional connections 306 for coupling additional devices to the switch 304.

In one embodiment, the barrier device 302 can be removably coupled with various communication devices for examining incoming data signals sent to and/or through the devices. For example, the barrier device 302 can be embodied in a modular card that is plugged into, connected with (e.g., using wires and/or wireless connections), or otherwise communicatively coupled with the wireless transceiver 208 outside of the switch 304 in order to examine data signals received by the wireless transceiver 208. The barrier device 302 can be removed from the transceiver 208 and connected with another device for examining data signals sent to that device.

Optionally, the barrier device 302 can be plugged into, connected with (e.g., using wires and/or wireless connections), or otherwise communicatively coupled with the cellular transceiver 206 outside of the switch 304 in order to examine data signals received by the transceiver 206. The barrier device 302 can be removed from the transceiver 206 and connected with another device for examining data signals sent to that device.

Optionally, the barrier device 302 can be plugged into, connected with (e.g., using wires and/or wireless connections), or otherwise communicatively coupled with the system transceiver 210 outside of the switch 304 in order to examine data signals received by the transceiver 210. The barrier device 302 can be removed from the transceiver 210 and connected with another device for examining data signals sent to that device.

Optionally, the barrier device 302 can be plugged into, connected with (e.g., using wires and/or wireless connections), or otherwise communicatively coupled with the vehicle information gateway 212 outside of the switch 304 in order to examine data signals received by the gateway 212. The barrier device 302 can be removed from the gateway 212 and connected with another device for examining data signals sent to that device.

Optionally, the barrier device 302 can be plugged into, connected with (e.g., using wires and/or wireless connections), or otherwise communicatively coupled with the energy management system 202 outside of the switch 304 in order to examine data signals received by the energy management system 202. The barrier device 302 can be removed from the energy management system 202 and connected with another device for examining data signals sent to that device.

Optionally, the barrier device 302 can be plugged into, connected with (e.g., using wires and/or wireless connections), or otherwise communicatively coupled with another communication device, such as a positive train control (PTC) transceiver or communication device, such as a wireless communication device configured to communicate at 220 MHz (or another frequency) for communicating with off-board devices.

The barrier device 302 examines one or more characteristics of an incoming data signal received by the barrier device 302 from a communication device disposed onboard and/or off-board the vehicle 102, such as the transceivers 206, 208, 210, the VIG 212, the EMS 202, etc. The incoming data signal may originate from another device (e.g., the devices 106, 108) and be communicated to the barrier device 302 before potentially being communicated to the control system 204. The barrier device 302 determines whether the incoming data signal is a secure data signal or insecure data signal based on the one or more characteristics of the signal that are examined. Responsive to determining that the incoming data signal is a secure data signal, the barrier device 302 communicates the incoming data signal to one or more onboard systems of the vehicle system 100 for use in controlling operation of the vehicle system 100, such as the control system 204 of one or more vehicles 102 in the vehicle system 100. The barrier device 302 also can prevent the incoming data from being communicated to the one or more onboard systems responsive to determining that the incoming data signal is an insecure data signal.

A variety of characteristics of an incoming data signal may be examined. For example, an identity of the source of the incoming data signal may be examined. Data packets forming the data signal can indicate the device 106, 108 that originated the signal, and the barrier device 302 can compare the identify of the originating device with one or more previously identified identities (e.g., of the devices 106, 108 that are permitted to communicate with the control system 204). These previously identified identities may be stored in the barrier device 302 or in a location feat is accessible to the device 302. If the identity of the originating device matches one or more of the previously identified identities, then the data signal is identified and communicated as a secure data signal. Otherwise, the data signal may be identified as an insecure data signal.

As another example, a location of the source of the incoming data signal may be examined. Data packets forming the data signal can indicate a location of the device 106, 108 that originated the signal, and the barrier device 302 can compare the location of the originating device with one or more previously identified locations. These locations may be IP addresses or other information associated with the signals. These previously identified locations may be stored in the barrier device 302 or in a location that is accessible to the device 302. If the location of the originating device matches one or more of the previously identified locations, then the data signal is identified and communicated as a secure data signal. Otherwise, the data signal may be identified as an insecure data signal.

Another example of a characteristic that may be examined includes a data format of the incoming data signal. A format of a signal can represent the syntax in which information is recorded, and/or read in the signal. For example, the format of a data signal may be based on a syntax of a communication protocol, such as one or more rules that define how various combinations of symbols, alphanumeric text, binary bits (e.g., 0's and 1's), and the like, are combined and used to represent and communicate data in a data signal. Because the communication system 200 may communicate a variety of data signals between different types of devices, the data signals may have a variety of different formats.

The barrier device 302 can examine the format of a data signal and compare this format with one or more previously identified formats. These previously identified formats may be stored in the barrier device 302 or in a location that is accessible to the device 302. If the format of the incoming data signal matches one or more of the previously identified formats, then the data signal is identified and communicated as a secure data signal. Otherwise, the data signal may be identified as an insecure data signal.

In another example, the barrier device 302 can examine a size of a data signal. The size of a data signal can represent the number of bits, bytes, etc., included in the data signal. Data signals may have a wide variety of numbers of bits in the signals depending on the information included in the data signals. But, because the universal set of devices that are permitted to communicate with the control system 204 to control operations of the vehicle system 100 is known, the range of sizes of the data signals communicated from these devices may be known. Data signals that are much larger than the sizes of the data signals typically communicated from the allowed or secure devices may indicate that the data signals are communicated from an unsecure device. The barrier device 302 can compare the size of an incoming data signal to a range or threshold of one or more designated sizes (e.g., less than 500 kilobytes (kB), between 20 and 150 kB, less than 2 megabytes (MB), or the like). If the size of an incoming data signal is within the designated range or is less than the designated threshold, then the data signal is identified and communicated as a secure data signal. Otherwise, the data signal may be identified as an insecure data signal.

As another example, the barrier device 302 can examine a communication rate of a data signal. The communication rate of a data signal can represent how rapidly the data signal is communicated. Data signals may be communicated at a variety of different speeds depending on the sources of the data signals. Because the universal set of devices that are permitted to communicate with the control system 204 to control operations of the vehicle system 100 is known, however, the range of communication rates at which the data signals are communicated from these devices may be known. Data signals communicated at slower and/or faster rates may be communicated from devices that are not previously identified and approved for communication with the control system 204. The barrier device 302 can compare the communication rate of an incoming data signal to a range or threshold of one or more designated communication rates (e.g., less than 1 megabits per second (1 Mbps), less than 10 Mbps, etc.). If the rate at which an incoming data signal is communicated is within the designated range or is less than the designated threshold, then the data signal is identified and communicated as a secure data signal. Otherwise, the data signal may be identified as an insecure data signal.

Responsive to identifying a data signal as an insecure data signal, the barrier device 302 may implement one or more responsive actions. As one example, the barrier device 302 can communicate the incoming data signal to an isolation location that is off-board the vehicle system 100. This isolation location can be a computer device (such as one or more of the devices 108) that stores the data signal, potentially for subsequent examination, while preventing the data signal from being used to control operation of the vehicle system 100. As another example, the barrier device 302 can record the incoming data signal in a log onboard the vehicle system 100. This log can be in a memory of the barrier device 302 or another location, and can store information about the data signal, such as the one or more characteristics of the data signal that were examined, the data signal itself, or other information.

Figure 4A:
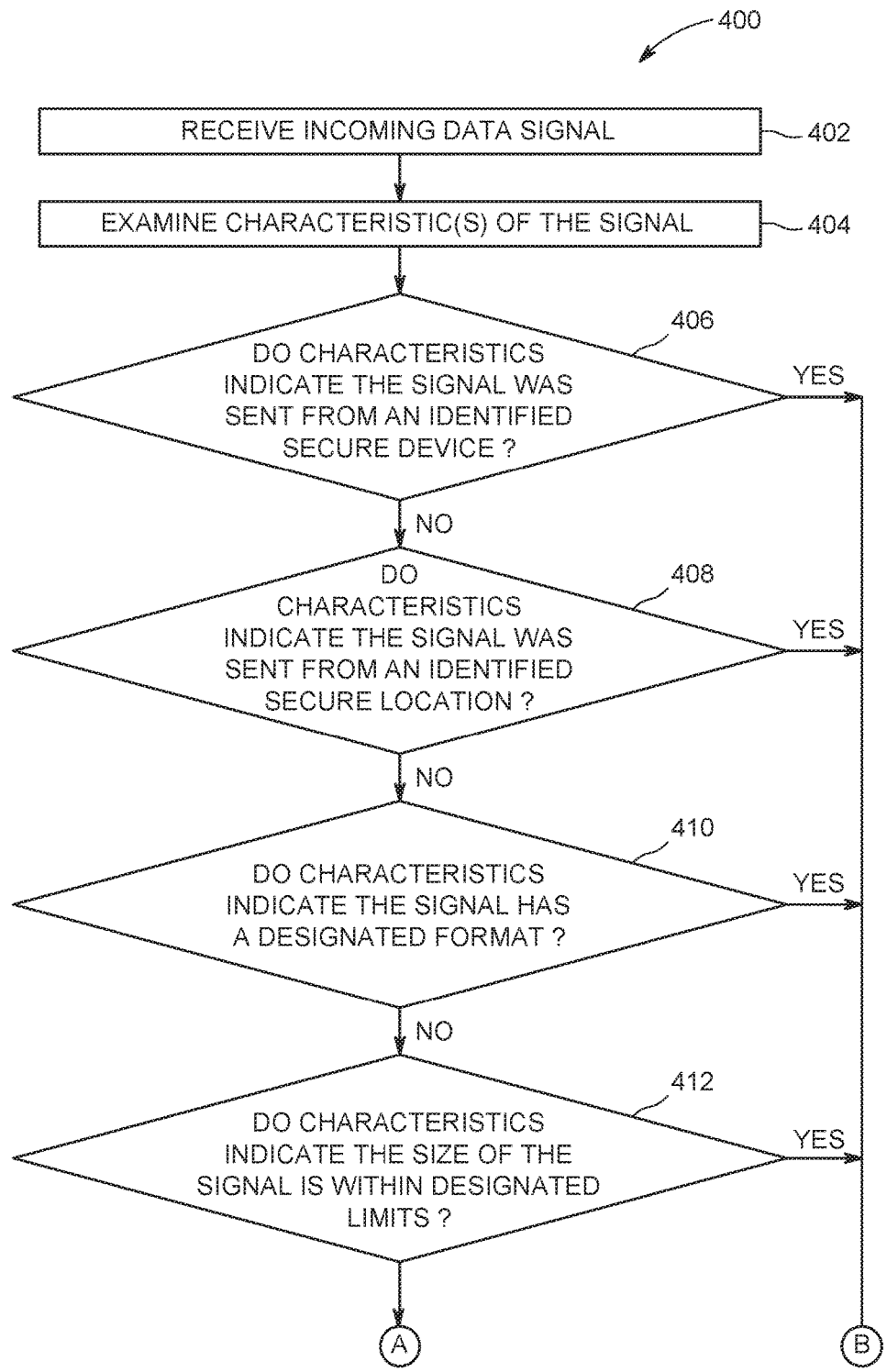
FIGS. 4A and 4B illustrate a flowchart of one embodiment of a method for securing a vehicle communication system.
Figure 4B:
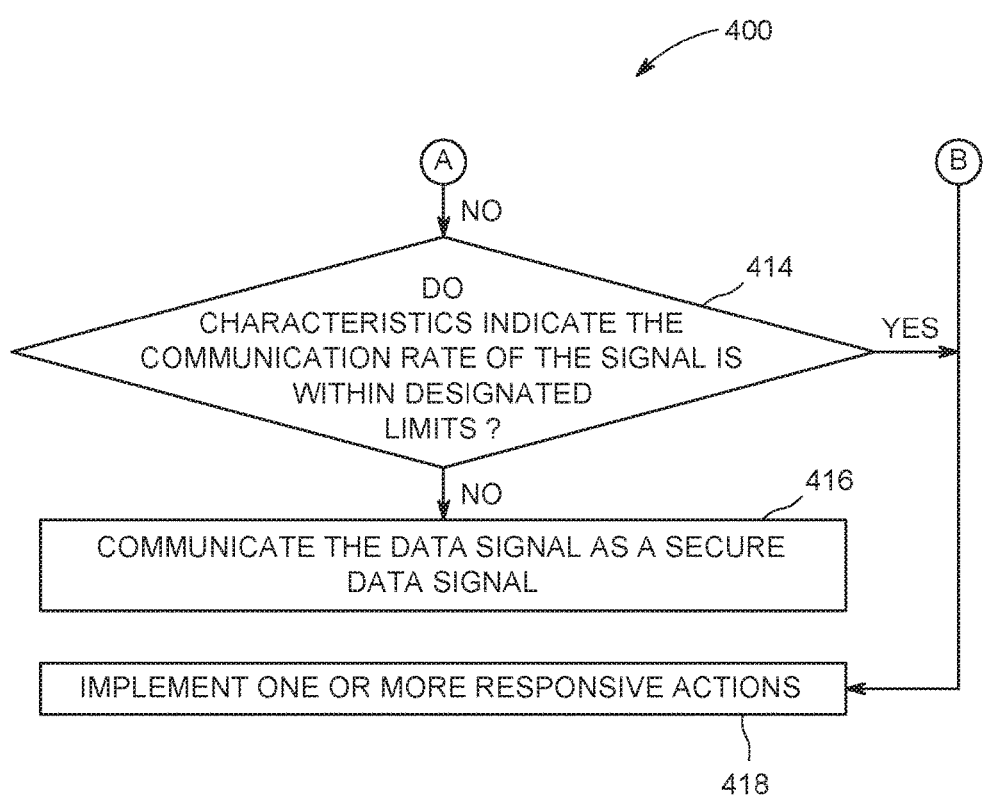

FIGS. 4A and 4B illustrate a flowchart of one embodiment of a method 400 for securing a vehicle communication system. The method 400 may be performed by one or more embodiments of the communication system 200 and/or security system 300, such as by the barrier device 302. At 400 in FIG. 4A, an incoming data signal is received. This signal may be sent from one or more devices, such as an off-board device 106, 108, a device onboard the vehicle 102, or a device onboard another vehicle 102. At 404 in FIG. 4A, one or more characteristics of the incoming data signal are examined. These characteristics can be examined in order to determine whether the data signal is sent from an approved or secure device, or if the signal is sent from another device, such as a device that is not approved for communicating with the vehicle system 100.

At 406 in FIG. 4A, a determination is made as to whether the characteristics indicate that the source of the incoming data signal is a device that has been identified as secure. Data packets forming the data signal can indicate the device that originated the signal, and the identity of the originating device can be compared with one or more previously identified identities. If the identity of the originating device matches one or more of the previously identified identities, then the data signal may be identified as a secure data signal. In one embodiment, flow of the method 400 can proceed toward 408 in FIG. 4A for one or more additional examinations of the data signal. Alternatively, flow of the method 400 could proceed toward 416 in FIG. 4B. But, if the identity of the originating device does not match one or more of the previously identified identities, then the data signal may be identified as an insecure data signal. Flow of the method 400 can then proceed toward 418 in FIG. 4B.

At 408 in FIG. 4A, a determination is made as to whether the characteristics indicate that the incoming data signal was sent from a location that has been identified as a secure location. Data packets forming the data signal can indicate a location of the device that originated the signal, and this location can be compared with one or more previously identified locations. If the location of the originating device matches one or more of the previously identified locations, then the data signal may be identified as a secure data signal. In one embodiment flow of the method 400 can proceed toward 410 in FIG. 4A for one or more additional examinations of the data signal. Alternatively, flow of the method 400 could proceed toward 416 in FIG. 4B. But, if the location of the originating device does not match one or more of the previously identified locations, then the data signal may be identified as an insecure data signal. Flow of the method 400 can then proceed toward 418 in FIG. 4B.

At 410 in FIG. 4A, a determination is made as to whether the characteristics of the data signal indicate that the format of the data signal is a designated format. If the format of the data signal matches one or more of the previously identified formats (e.g., designated formats), then the data signal may be identified as a secure data signal. In one embodiment, flow of the method 400 can proceed toward 412 in FIG. 4A for one or more additional examinations of the data signal. Alternatively, flow of the method 400 could proceed toward 416 in FIG. 4B. But, if the format of the data signal does not match one or more of the previously identified formats, then the data signal may be identified as an insecure data signal. Flow of the method 400 can then proceed toward 418 in FIG. 4B.

At 412 in FIG. 4A, a determination is made as to whether the characteristics of the data signal indicate that the size of the data signal is within designated limits. If the size of the originating device is within a designated range, then the data signal may be identified as a secure data signal. In one embodiment, flow of the method 400 can proceed toward 414 in FIG. 4B for one or more additional examinations of the data signal. Alternatively, flow of the method 400 could proceed toward 416 in FIG. 4B. But, if the size of the data signal is too small or too large, then the size may indicate that the signal was not sent from a previously approved or identified device. As a result, the data signal may be identified as an insecure data signal. Flow of the method 400 can then proceed toward 418 in FIG. 4B.

At 414 in FIG. 4B, a determination is made as to whether the characteristics of the data signal indicate that the data signal is being communicated at a rate that is within designated limits. If the communication rate of the data signal is within a designated range of communication speeds, then the data signal may be identified as a secure data signal. In one embodiment, flow of the method 400 can proceed toward 416 in FIG. 4B. But, if the data signal is being communicated at too slow or too fast of a speed, then the communication rate may indicate that the signal was not sent from a previously approved or identified device. As a result, the data signal may be identified as an insecure data signal. Flow of the method 400 can then proceed toward 418 in FIG. 4B.

At 416 in FIG. 4B, the data signal is communicated as a secure data signal. The signal may be communicated to one or more devices to which the signal is intended or addressed, such as a control system of a vehicle. The data signal may be communicated to control operations of the vehicle or vehicle system.

At 418 in FIG. 4B, one or more responsive actions are implemented to control the insecure data signal. The data signal can be communicated to an isolation location that is off-board the vehicle system. As another example, the incoming data signal can be stored in a log onboard the vehicle system. The data signal may not be communicated to the control system (or optionally, to any other devices) to prevent the data signal from causing harm or disrupting operations of the vehicle system.

In one embodiment, a system (e.g., a vehicle communication network security system) includes one or more processors configured to be disposed onboard a vehicle system formed from one or more vehicles traveling together along a route. The one or more processors are configured to examine one or more characteristics of an incoming data signal received by the one or more processors from a communication device disposed onboard the vehicle system. The one or more processors can be configured to determine whether the incoming data signal is a secure data signal or an insecure data signal based on the one or more characteristics, to communicate the incoming data signal to one or more onboard systems of the vehicle system for use by the one or more onboard systems in controlling operation of the vehicle system responsive to determining that the incoming data signal is the secure data signal, and to prevent the incoming data from being communicated to the one or more onboard systems responsive to determining that the incoming data signal is the insecure data signal.

Optionally, the system may include a modular card unit that includes the one or more processors, the modular card unit configured to be inserted into a network switch of the vehicle system that receives the incoming data signal.

Optionally, the one or more processors can be configured to communicate the incoming data signal to a controller of the vehicle system that is configured to control one or more of tractive effort or braking effort generated by the vehicle system responsive to the incoming data signal being the secure data signal.

Optionally, the one or more processors can be configured to determine whether the incoming data signal is sent from one or more previously identified secure communication systems located one or more of onboard or off-board the vehicle system based on the one or more characteristics of the incoming data signal.

Optionally, the one or more processors can be configured to examine one or more of a data format of the data signal, a bit size of the data signal, and/or a communication rate of the data signal as the one or more characteristics.

Optionally, the one or more processors can be configured to examine a data format of the data signal. The one or more processors also can be configured to determine that the incoming data signal is the secure data signal responsive to the data format being a format associated with one or more previously identified communication systems located one or more of onboard or off-board the vehicle system.

Optionally, the one or more processors can be configured to examine a bit size of the data signal, and to determine that the incoming data signal is the secure data signal responsive to the bit size being within a designated range of bit sizes associated with one or more previously identified communication systems located one or more of onboard or off-board the vehicle system.

Optionally, the one or more processors can be configured to examine a communication rate of the data signal, and to determine that the incoming data signal is the secure data signal responsive to the communication rate being within a designated range of communication rates associated with one or more previously identified communication systems located one or more of onboard or off-board the vehicle system.

Optionally, the one or more processors can be configured to communicate the incoming data signal to an isolation location that is off-board the vehicle system responsive to determining that the incoming data signal is the insecure data signal.

Optionally, the one or more processors can be configured to record the incoming data signal in a log responsive to determining that the incoming data signal is the insecure data signal.

Optionally, the one or more processors can be configured to examine the one or more characteristics of the incoming data signal as received by the communication device from plural off-board sources, and to examine the one or more characteristics of the incoming data signal as received by the communication device from plural onboard sources.

Optionally, the off-board sources can include a cellular communication device, a WiFi communication device, and a wireless device configured to communicate at 220 MHz, and the onboard sources can include one or more of a distributed power wireless communication device, a cellular transceiver, a WiFi transceiver, or an energy management system.

Optionally, the system also can include a modular card unit that includes the one or more processors, where the modular card unit is configured to be inserted into a network switch of the vehicle system that receives the incoming data signal.

In one embodiment, a method (e.g., for securing a vehicle communication system) includes examining one or more characteristics of an incoming data signal received by a communication network security device disposed onboard a vehicle system formed from one or more vehicles traveling together along a route, determining whether the incoming data signal is a secure data signal or an insecure data signal based on the one or more characteristics, communicating the incoming data signal to one or more onboard systems of the vehicle system for use by the one or more onboard systems in controlling operation of the vehicle system responsive to determining that the incoming data signal is the secure data signal, and preventing communication of the incoming data to the one or more onboard systems responsive to determining that the incoming data signal is the insecure data signal.

Optionally, the method also can include determining whether the incoming data signal is sent from one or more previously identified secure communication systems located one or more of onboard or off-board the vehicle system based on the one or mote characteristics of the incoming data signal.

Optionally, the one or more characteristics can include one or more of a data format of the data signal, a bit size of the data signal, or a communication rate of the data signal.

Optionally, a data format of the data signal can be examined and the incoming data signal can be determined to be the secure data signal responsive to the data format being a format associated with one or more previously identified communication systems located on one or more of onboard or onboard the vehicle system.

Optionally, a bit size of the data signal can be examined and the incoming data signal can be determined to be the secure data signal responsive to the bit size being within a designated range of bit sizes associated with one or more previously identified communication systems located one or more of onboard or off-board the vehicle system.

Optionally, a communication rate of the data signal can be examined and the incoming data signal can be determined to be the secure data signal responsive to the communication rate being within a designated range of communication rates associated with one or more previously identified communication systems located one or more of onboard or off-board the vehicle system.

In one embodiment, a system (e.g., a communication network security system) includes one or more processors configured to be disposed onboard a vehicle system formed from one or more vehicles traveling together along a route. The one or more processors are configured to examine one or more characteristics of an incoming data signal received by the one or more processors from a communication device disposed onboard the vehicle, and to determine whether the incoming data signal is a secure data signal or an insecure data signal based on the one or more characteristics. The one or more processors can communicate the incoming data signal to one or more onboard systems of the vehicle system for use by the one or more onboard systems in controlling operation of the vehicle system responsive to determining that the incoming data signal is the secure data signal, and can communicate the incoming data signal to a controller of the vehicle system that is configured to control one or more of tractive effort or braking effort generated by the vehicle system responsive to the incoming data signal being the secure data signal. The controller may be in addition to the one or more onboard systems of the vehicle system.

Optionally, the one or more processors can be configured to prevent the incoming data from being communicated to the one or more onboard systems responsive to determining that the incoming data signal is the insecure data signal.

Optionally, the one or more processors can be configured to determine whether the incoming data signal is sent from one or more previously identified secure communication systems located one or more of onboard or off-board the vehicle system based on the one or more characteristics of the incoming data signal.

Optionally, the one or more processors can be configured to examine one or more of a data format of the data signal, a bit size of the data signal, and/or a communication rate of the data signal as the one or more characteristics.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
hardware circuitry that one or more of includes or is connected with one or more processors configured to be disposed onboard a vehicle system formed from one or more vehicles traveling together along a route, the one or more processors configured to examine one or more characteristics of an incoming data signal received by the one or more processors from a communication device disposed onboard the vehicle system, the one or more characteristics that are examined by the one or more processors including a speed at which the incoming data signal is communicated, the one or more processors configured to determine whether the incoming data signal is a secure data signal or an insecure data signal by comparing the speed at which the incoming data signal is communicated with a range of acceptable communication rates, the one or more processors configured to determine that the incoming data signal is not the secure data signal or is the insecure data signal responsive to the incoming data signal being communicated at a communication rate that is faster or slower than the range of acceptable communication rates, the one or more processors also configured to communicate the incoming data signal to one or more onboard systems of the vehicle system for use by the one or more onboard systems in controlling operation of the vehicle system responsive to determining that the incoming data signal is the secure data signal, and to prevent the incoming data from being communicated to the one or more onboard systems responsive to determining that the incoming data signal is the insecure data signal.

2. The system of claim 1, further comprising a modular card unit that includes the one or more processors, the modular card unit configured to be inserted into a network switch of the vehicle system that receives the incoming data signal.

3. The system of claim 1, wherein the one or more processors are configured to communicate the incoming data signal to a controller of the vehicle system that changes tractive effort generated by the vehicle system responsive to determining that the incoming data signal is the secure data signal.

4. The system of claim 1, wherein the one or more processors are configured to determine whether the incoming data signal is sent from one or more previously identified secure communication systems located one or more of onboard or off-board the vehicle system based on the one or more characteristics of the incoming data signal.

5. The system of claim 1, wherein the one or more processors also are configured to examine one or more of a data format of the incoming data signal or a bit size of the incoming data signal as the one or more characteristics to determine whether the incoming data signal is the secure data signal or the insecure data signal.

6. The system of claim 1, wherein the one or more processors are configured to examine a data format of the incoming data signal as the one or more characteristics of the incoming data signal, the one or more processors also configured to determine that the incoming data signal is the secure data signal responsive to the data format being a format associated with one or more previously identified communication systems located one or more of onboard or off-board the vehicle system.

7. The system of claim 1, wherein the one or more processors are configured to examine a bit size of the incoming data signal as the one or more characteristics of the incoming data signal, the one or more processors also configured to determine that the incoming data signal is the secure data signal responsive to the bit size being within a designated range of bit sizes associated with one or more previously identified communication systems located one or more of onboard or off-board the vehicle system.

8. The system of claim 1, wherein the range of acceptable communication rates is associated with one or more previously identified communication systems located one or more of onboard or off-board the vehicle system.

9. The system of claim 1, wherein the one or more processors are configured to communicate the incoming data signal to an isolation location that is off-board the vehicle system responsive to determining that the incoming data signal is the insecure data signal.

10. The system of claim 1, wherein the one or more processors are configured to record the incoming data signal in a log responsive to determining that the incoming data signal is the insecure data signal.

11. The system of claim 1, wherein the one or more processors are configured to examine the one or more characteristics of the incoming data signal as received by the communication device from plural off-board sources, and to examine the one or more characteristics of the incoming data signal as received by the communication device from plural onboard sources.

12. The system of claim 11, wherein the off-board sources comprise a cellular communication device, a WiFi communication device, and a wireless device configured to communicate at 220 MHz, and the onboard sources comprise one or more of a distributed power wireless communication device, a cellular transceiver, a WiFi transceiver, or an energy management system.

13. The system of claim 12, further comprising a modular card unit that includes the one or more processors, the modular card unit configured to be inserted into a network switch of the vehicle system that receives the incoming data signal.

14. A method comprising:
examining one or more characteristics of an incoming data signal received by a communication network security device disposed onboard a vehicle system formed from one or more vehicles traveling together along a route, the one or more characteristics that are examined including a speed at which the incoming data signal is communicated;
determining whether the incoming data signal is a secure data signal or an insecure data signal based on the speed at which the incoming data signal is communicated, wherein the speed at which the incoming data signal is communicated is compared to a range of acceptable communication rates, and wherein the incoming data signal is identified as the insecure data signal or is not identified as the secure data signal responsive to the incoming data signal being communicated at a communication rate that is faster or slower than the range of acceptable communication rates;
communicating the incoming data signal to one or more onboard systems of the vehicle system for use by the one or more onboard systems in controlling operation of the vehicle system responsive to determining that the incoming data signal is the secure data signal; and
preventing communication of the incoming data to the one or more onboard systems responsive to determining that the incoming data signal is the insecure data signal.

15. The method of claim 14, further comprising determining whether the incoming data signal is sent from one or more previously identified secure communication systems located one or more of onboard or off-board the vehicle system based on the one or more characteristics of the incoming data signal.

16. The method of claim 14, wherein the one or more characteristics that is examined also includes one or more of a data format of the incoming data signal or a bit size of the incoming data signal.

17. The method of claim 14, wherein a data format of the incoming data signal also is examined as the one or more characteristics and the incoming data signal is determined to be the secure data signal responsive to the data format being a format associated with one or more previously identified communication systems located on one or more of onboard or off-board the vehicle system.

18. The method of claim 14, wherein a bit size of the incoming data signal also is examined as the one or more characteristics and the incoming data signal is determined to be the secure data signal responsive to the bit size being within a designated range of bit sizes associated with one or more previously identified communication systems located one or more of onboard or off-board the vehicle system.

19. The method of claim 14, wherein the designated range of acceptable communication rates is associated with one or more previously identified communication systems located one or more of onboard or off-board the vehicle system.

20. A system comprising:
hardware circuitry that one or more of includes or is connected with one or more processors configured to be disposed onboard a vehicle system formed from one or more vehicles traveling together along a route, the one or more processors configured to examine a speed at which an incoming data signal is received by the one or more processors from a communication device disposed onboard the vehicle, the one or more processors configured to determine whether the incoming data signal is a secure data signal or an insecure data signal based on the speed that is examined by comparing the speed at which the incoming data signal is communicated to a range of acceptable communication rates, and wherein the incoming data signal is not identified as the secure data signal or is identified as the insecure data signal responsive to the incoming data signal being communicated at a communication rate that is faster or slower than the range of acceptable communication rates, the one or more processors also configured to communicate the incoming data signal to one or more onboard systems of the vehicle system for use by the one or more onboard systems in controlling operation of the vehicle system responsive to determining that the incoming data signal is the secure data signal, and to communicate the incoming data signal to a controller of the vehicle system that is configured to control one or more of tractive effort or braking effort generated by the vehicle system responsive to the incoming data signal being the secure data signal, wherein the controller is in addition to the one or more onboard systems.

21. The system of claim 20, wherein the one or more processors are configured to prevent the incoming data from being communicated to the one or more onboard systems responsive to determining that the incoming data signal is the insecure data signal.

22. The system of claim 20, wherein the one or more processors are configured to determine whether the incoming data signal is sent from one or more previously identified secure communication systems located one or more of onboard or off-board the vehicle system based on the speed at which the incoming data signal is communicated.

23. The system of claim 20, wherein the one or more processors also are configured to examine one or more of a data format of the data signal or a bit size of the data signal to determine whether the incoming data signal is the secure data signal or the insecure data signal.

* * * * *